(12) United States Patent
Saito et al.

(10) Patent No.: US 6,379,768 B1
(45) Date of Patent: Apr. 30, 2002

(54) OPTICAL INFORMATION RECORDING MEDIUM

(75) Inventors: Naoki Saito, Minami-ashigara; Yoshihisa Usami; Noboru Komori, both of Odawara, all of (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 36 days.

(21) Appl. No.: 09/657,977

(22) Filed: Sep. 8, 2000

(30) Foreign Application Priority Data

Sep. 8, 1999 (JP) ............................................. 11-254672

(51) Int. Cl.$^7$ ................................................. B32B 3/02
(52) U.S. Cl. .................... 428/64.1; 428/64.4; 428/64.8; 430/270.18
(58) Field of Search ................................ 428/64.1, 64.2, 428/64.4, 64.8, 913; 430/270.14, 270.18, 495.1, 945

(56) References Cited

U.S. PATENT DOCUMENTS 5,948,593 A * 9/1999 Misawa ................. 430/270.16
6,103,331 A * 8/2000 Kanno ....................... 428/64.1
6,232,036 B1 * 5/2001 Suzuki .................. 430/270.16

\* cited by examiner

*Primary Examiner*—Elizabeth Evans
(74) *Attorney, Agent, or Firm*—Birch, Stewart, Kolasch & Birch, LLP

(57) ABSTRACT

An optical information recording medium composed of a substrate and a recording layer having a dye compound of the formula (I):

$$R^1R^2C=L^1-L^2=L^3-NR^3R^4 \quad (I)$$

in which each of $R^1$ and $R^2$ is an electron-attracting group (i.e., electron-withdrawing group) having a Hammett's substituent constant $\sigma_p$ in the range of 0.2 to 0.9; each of $L^1$, $L^2$, and $L^3$ is a methine group which can have a substituent under such condition that two or three of $L^1$, $L^2$, and $L^3$ can form a ring structure together with the substituent; and each of $R^3$ and $R^4$ is a hydrogen atom, an alkyl group, an aryl group, an aralkyl group, or a heterocyclic group, provided that each set of $R^1$ and $R^2$, $R^2$ and a substituent of $L^1$, $R^2$ and a substituent of $L^2$, $R^2$ and a substituent of $L^3$, a substituent of $L^1$ and $R^3$, a substituent of $L^2$ and $R^3$, a substituent of $L^3$ and $R^3$, and $R^3$ and $R^4$ can be connected to each other to form a ring structure, is advantageously employed for recording information utilizing a laser beam having a wavelength of 550 nm or shorter.

13 Claims, No Drawings

OPTICAL INFORMATION RECORDING MEDIUM

FIELD OF THE INVENTION

This invention relates to an optical information recording medium on which information can be recorded by means of a laser beam and the recorded information can be reproduced by means of a laser beam. Particularly, the invention relates to an optical information recording medium of heat-mode type on which information can be recorded utilizing a laser beam of a short wavelength such as 550 nm or shorter.

BACKGROUND OF THE INVENTION

An optical information recording medium (namely, optical disc) on which information can be only once recorded by means of a laser beam is known as a recordable compact disc (CD-R). The optical disc comprises a transparent substrate on which an recording organic dye layer, a light-reflecting layer (made of metal such as gold), and a protective resin layer are placed in order. The information is recorded on the CD-R by applying a laser beam of a near infrared region (generally, a laser beam having a wavelength in the vicinity of 780 nm). The recording layer of CD-R absorbs energy of the laser beam on the applied area, and the temperature of the recording layer on the area rises to bring about change of physical or chemical property in the layer (for instance, production of pit). The laser beam-applied area in the recording layer is thus changed in its optical property, whereby the information is recorded on CD-R.

The read-out (i.e., reproduction) of the recorded information is generally performed by applying on the CD-R a laser-beam having the same wavelength. The recorded information is detected by comparing difference of reflectance between the information-recorded area and its surrounding area.

Recently, an optical information recording medium having increased recording capacity is desired, and a recordable digital video disc (DVD-R) is developed. The developed DVD-R comprises a transparent substrate disc having such a narrow pre-groove (approximately in the range of 0.74 to 0.8 μm, which is less than a half of the pre-groove of CD-R), a recording dye layer, a light-reflecting layer, and a protective layer. On the protective layer or in place of the protective layer, another transparent substrate having the same size is fixed using an adhesive. Otherwise, a pair of the composite structure composed of the transparent substrate disc, recording dye layer, and light-reflecting layer are combined by an adhesive under the condition that the substrate discs are placed on the outermost side. On the DVD-R is recorded information by applying a laser beam in the visible region (generally, 630 to 680 nm). On the DVD-R, it is capable to record the information at a density higher than on the CD-R.

At present, a network which can transmit an image information such as Internet is widely utilized. Moreover, a high-vision television system and a high definition television (HDTV) system are developed. In any systems, a recording medium which can store a large amount of information is required. Although DVD-R has a an enough recording capacity at the present time, its recording capacity appears to be not sufficient, in view of the forthcoming requirement for increased recording capacity. From the above-mentioned viewpoint, an optical information disc showing increased recording capacity using a laser beam of further shorter wavelength is now under study.

Typical study is focused on the use of a laser beam of 550 nm or shorter to record information on a recording dye layer on a transparent disc. A variety of dyes, such as porphyrin compounds, azo dyes, metal azo dyes, quinophthalone dyes, trimethinecyanine dyes, dicyanovinylphenyl dyes, and coumarin compounds are studied and reported in Japanese Patent Provisional Publications No.8-1271705, No.11-53758, No.11-334204, No.11-334205, No.11-334206, No.11-334207, No.2000-43423, No.2000-108513, and No.2000-149320. As for the laser beam for recording and reproducing procedure, a laser beam of blue light (wavelength: 430 nm or 488 nm) or a laser beam of blue-green light (wavelength: 515 nm) is reported.

SUMMARY OF THE INVENTION

It is an object of the present invention to provide an optical recording medium which shows enough recording properties such as a high density recording capacity, a high sensitivity and a high modulation when a laser beam of light having a shorter wavelength such as 550 nm or shorter, particularly a laser beam of light having a wavelength of 450 nm or shorter is employed in the information recording and reproducing procedures.

As a result of studies performed by the inventors, it is discovered that specific dye compounds, namely, aminobutadiene dyes, are favorably employed because the aminobutadiene dyes show a high sensitivity to a laser beam of light having a shorter wavelength such as 550 nm or shorter, particularly, 450 nm or shorter, and further show a high light reflection and a high modulation.

Accordingly, the present invention resides in an optical information recording medium comprising a substrate and a recording layer provided thereon on which information is recorded by irradiation with a laser beam, wherein the recording layer comprises a dye compound having the following formula (I):

$$R^1R^2C\!=\!L^1\!-\!L^2\!=\!L^3\!-\!NR^3R^4 \qquad (I)$$

in which each of $R^1$ and $R^2$ independently represents an electron-attracting group having a Hammett's substituent constant $\sigma_p$ in the range of 0.2 to 0.9; each of $L^1$, $L^2$, and $L^3$ independently represents a methine group which can have a substituent under such condition that two or three of $L^1$, $L^2$, and $L^3$ can form a ring structure together with the substituent; and each of $R^3$ and $R^4$ independently represents a hydrogen atom, an alkyl group, an aryl group, an aralkyl group, or a heterocyclic group, provided that each set of $R^1$ and $R^2$, $R^2$ and a substituent of $L^1$, $R^2$ and a substituent of $L^2$, $R^2$ and a substituent of $L^3$, a substituent of $L^1$ and $R^3$, a substituent of $L^2$ and $R^3$, a substituent of $L^3$ and $R^3$, and $R^3$ and $R^4$ can be connected to each other to form a ring structure.

When a set of $R^1$ and $R^2$, $R^2$ and a substituent of $L^1$, $R^2$ and a substituent of $L^2$, $R^2$ and a substituent of $L^3$ in the formula (I) is connected to each other to form a ring structure, the Hamett's substituent constant $\sigma_p$ corresponds to that of a substituent group which is formed by cutting the ring at the end of the substituent (corresponding to the furthermost position (i.e., top position) of the substituent and then putting a hydrogen atom to the end position.

The determination of Hamett's substituent constant $\sigma_p$ is further explained by referring to the following examples.

(1) The case where $R^1$ and $R^2$ are connected to each other to form a ring structure (its representative compounds are the after-illustrated compounds I-5, I-6, I-7, I-12, I-13, I-15, I-20, I-21, I-22, and I-23)

The substituent constant $\sigma_p$ of $R^1$ is equivalent to a of H—$R^2$—$R^1$— group, and the substituent constant $\sigma_p$ of $R^2$ is equivalent to $\sigma_p$ of H—$R^1$—$R^2$— group. In this case, therefore, the substituent constant $\sigma_p$ of $R^1$ may differ from the substituent constant $\sigma_p$ of $R^2$, since the end portion of each of $R^1$ and $R^2$ differs from each other.

(2) The case where. $R^2$ and a substituent of $L^2$ are connected to each other to form a ring structure (its representative compounds are the after-illustrated compounds I-16 and I-18)

The substituent constant $\sigma_p$ of $R^2$ is equivalent to $\sigma_p$ of —$R^2$—H group which is formed by cutting $R^2$ at the end position at which $R^2$ is connected to $L^2$, and then putting a hydrogen atom to the end position The present invention further resides in a method of recording information on the optical information recording disc of the invention 1 by means of a laser beam having a wavelength of 550 nm or shorter, particularly a laser beam having a wavelength of 450 nm or shorter.

In the formula (I), it is preferred that each of $R^1$ and $R^2$ independently is a cyano group, a nitro group, an acyl group, an alkoxycarbonyl group, an aryloxycarbonyl group, a carbamoyl group, an alkylsulfonyl group, an arylsulfonyl group, an alkoxysulfonyl group, a sulfamoyl group, an alkylsulfinyl group, an arylsulfinyl group, a sulfino group, a halogen atom, an alkynyl group, a diacylamino group, a phosphono group, a carboxyl group, or a hetero-cyclic group.

It is also preferred that each of $R^3$ and $R^4$ of the formula (I) independently is a hydrogen atom, an alkyl group which has 1 to 20 carbon atoms and which can have one or more substituents, an aryl group which has 6 to 18 carbon atoms and which can have one or more substituents, an aralkyl group which has 7 to 18 carbon atoms and which can have one or more substituents, or a 5- or 6-membered hetero-cyclic group which can have one or more substituents Particularly preferred is that at least one of $R^3$ and $R^4$ is an alkyl group having 1 to 20 carbon atoms, more preferably 1 to 6 carbon atoms.

The formula (I) is preferably represented by the following formula (I-A):

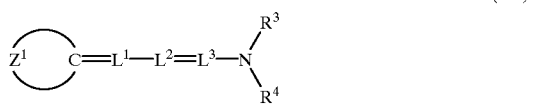

(I-A)

in which $Z^1$ stands for a group of atoms required for forming a 5- or 6-membered carbon ring or hetero-cyclic ring structure which can have one or more substituents; each of $L^1$, $L^2$, and $L^3$ independently represents a methine group which can have a substituent under such condition that two or three of $L^1$, $L^2$, and $L^3$ can form a ring structure together with the substituent; and each of $R^3$ and $R^4$ independently represents a hydrogen atom, an alkyl group, an aryl group, or an aralkyl group.

The formula (I) is also preferably represented by the following formula (I-B):

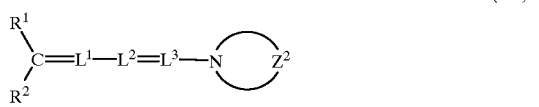

(I-B)

in which each of $R^1$ and $R^2$ independently represents an electron-attracting group having a Hamett's substituent constant $\sigma_p$ in the range of 0.2 to 0.9; each of $L^1$, $L^2$, and $L^3$ independently represents a methine group which can have a substituent under such condition that two or three of $L^1$, $L^2$, and $L^3$ can form a ring structure together with the substituent; and $Z^2$ stands for a group of atoms required for forming a 5- or 6-membered nitrogen atom-containing hetero-cyclic ring structure which can have one or more substituents.

The formula (I) is also preferably represented by the following formula (I-C):

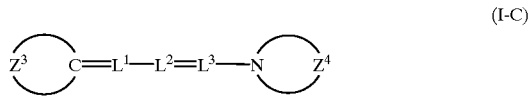

(I-C)

which $Z^3$ stands for a group of atoms required for forming a 5- or 6-membered carbon ring or hetero-cyclic ring structure which can have one or more substituents; each of $L^1$, $L^2$, and $L^3$ independently represents a methine group which can have a substituent under such condition that two or three of $L^1$, $L^2$, and $L^3$ can form a ring structure together with the substituent; and $Z^4$ stands for a group of atoms required for forming a 5- or 6-membered nitrogen atom-containing hetero-cyclic ring structure which can have one or more substituents.

The formula (I) is also preferably represented by the following formula (I-D):

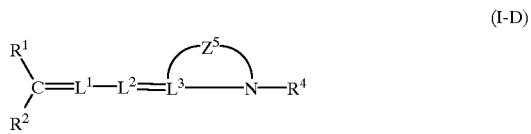

(I-D)

in which each of $R^1$ and $R^2$ independently represents an electron-attracting group having a Hamett's substituent constant $\sigma_p$ in the range of 0.2 to 0.9; each of $L^1$, $L^2$, and $L^3$ independently represents a methine group which can have a substituent under such condition that two or three of $L^1$, $L^2$, and $L^3$ can form a ring structure together with the substituent; $Z^5$ stands for a group of atoms required for forming a 5- or 6-membered nitrogen atom-containing hetero-cyclic ring structure which can have one or more substituents; and $R_4$ represents an alkyl group.

The formula (I) is also preferably represented by the following formula (I-E):

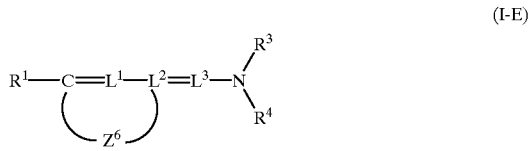

(I-E)

in which $R^1$ represents an electron-attracting group having a Hamett's substituent constant $\sigma_p$ in the range of 0.2 to 0.9; each of $L^1$ and $L^3$ independently represents a methine group which can have a substituent; $L^2$ represents a methine group; $Z^6$ stands for a group of atoms required for forming, in combination of C=$L^1$—$L^2$ group, a 5- or 6-membered carbon ring or hetero-cyclic ring structure which can have one or more substituents; and each of $R^3$ and $R^4$ representsan alkyl group.

In the optical information recording medium of the invention, the substrate preferably is a transparent disc which has on one surface a pre-groove having a track pitch of 0.2 to 0.8 μm (more preferably 0.25 to 0.8 μm, most preferably 0.3 to 0.8 μm) and the recording layer is arranged on the surface having the pre-groove.

The optical information recording medium of the invention preferably has a metallic light-reflecting layer on the recording layer, and a protective layer on or above the recording layer.

DETAILED DESCRIPTION OF THE INVENTION

The information recording medium of the invention is characterized by having a recording layer which comprises a dye compound of the below-illustrated formula (I).

$$R^1R^2C=L^1—L^2=L^3—NR^3R^4 \quad (I)$$

In the above-illustrated formula (I), each of $R^1$ and $R^2$ independently represents an electron-attracting group having a Hamett's substituent constant $\sigma_p$ in the range of 0.2 to 0.9; each of $L^1$, $L^2$, and $L^3$ independently represents a methine group which can have a substituent under such condition that two or three of $L^1$, $L^2$, and $L^3$ can form a ring structure together with the substituent; and each of $R^3$ and $R^4$ independently represents a hydrogen atom, an alkyl group, an aryl group, an aralkyl group, or a heterocyclic group, provided that each set of $R^1$ and $R^2$, $R^2$ and a substituent of $L^1$, $R^2$ and a substituent of $L^2$, $R^2$ and a substituent of $L^3$, a substituent of $L^1$ and $R^3$, a substituent of $L^2$ and $R^3$, a substituent of $L^3$ and $R^3$, and $R^3$ and $R^4$ can be connected to each other to form a ring structure.

In the formula (I), the Hamett's substituent constant $\sigma_p$ preferably is in the range of 0.30 to 0.85, more preferably in the range of 0.35 to 0.80. The Hammett's substituent constant $\sigma_p$ is described in Chem. Rev. 91, 165 (1991).

Examples of the electron-attracting groups for $R^1$ and $R^2$ include a cyano group, a nitro group, an acyl group having 1 to 10 carbon atoms (e.g., acetyl, propionyl, butyryl, pivaloyl, and benzoyl), an alkoxycarbonyl group having 2 to 12 carbon atoms (e.g., methoxycarbonyl, ethoxycarbonyl, isopropoxycarbonyl, butoxycarbonyl, and decyloxycarbonyl), an aryloxycarbonyl group having 7 to 11 carbon atoms (e.g., phenoxycarbonyl), a carbamoyl group having 1 to 10 carbon atoms (e.g., methylcarbamoyl, ethylcarbamoyl, and phenylcarbamoyl), an alkylsulfonyl group having 1 to 10 carbon atoms (e.g., methanesulfonyl), an arylsulfonyl group having 6 to 10 carbon atoms (e.g., benzenesulfonyl), an alkoxysulfonyl group having 1 to 10 carbon atoms (e.g., methoxysulfonyl), a sulfamoyl group having 1 to 10 carbon atoms (e.g., ethylsulfamoyl and phenylsulfamoyl), an alkylsulfinyl group having 1 to 10 carbon atoms (e.g., methanesulfinyl and ethanesulfinyl), an arylsulfinyl group having 6 to 10 carbon atoms (e.g., benzenesulfinyl), a sulfino group, a halogen atom, an alkynyl group having 2 to 10 carbon atoms (e.g., ethynyl), a diacylamino group having 2 to 10 carbon atoms (e.g., diacetylamino), a phosphono group, a carboxyl group, or a 5- or 6-membered hetero-cyclic group (e.g., 2-benzothiazolyl, 2-benzoxazolyl, 3-pyridyl, 5-(1H)-tetrazolyl, and 4-pyrimidyl).

Preferred examples of the electron-attracting groups for $R^1$ and $R^2$ are a cyano group, a nitro group, an acyl group (particularly, acetyl, pivaloyl, and benzoyl), an alkoxycarbonyl group (particularly, ethoxycarbonyl, isopropoxycarbonyl, butoxycarbonyl, and decyloxycarbonyl), a carbamoyl group (particularly, phenylcarbamoyl), an alkylsulfonyl group (particularly, methanesulfonyl), an arylsulfonyl group (particularly, benzenesulfonyl), a sulfamoyl group (particularly, phenylsulfamoyl), and an alkylsulfinyl group (particularly, methanesulfinyl. Most preferred are a cyano group, an acyl group, an alkoxycarbonyl group, a carbamoyl group, an alkylsulfonyl group, and an arylsulfonyl group.

The methine group for $L^1$, $L^2$, and $L^3$ can have a substituent. Examples of the substituents include an alkyl group having 1 to 6 carbon atoms (e.g., methyl, ethyl, propyl, and butyl) which can have one or more substituents, and an aryl group having 6 to 10 carbon atoms (e.g., phenyl) which can have one or more substituents. Preferred examples of the methine groups for $L^1$, $L^2$, and $L^3$ are an unsubstituted methine group and a methine group having an alkyl group (e.g., methyl and ethyl) or phenyl as the substituent. Two or three of $L^1$, $L^2$, and $L^3$ can form a ring structure together with the substituent. Preferred ring structure is a 5- or 6-membered carbon ring structure (e.g., cyclohexene ring) formed by connecting $L^1$ and $L^3$ of the $L^1—L^2=L^3$ moiety to each other. The ring structure can have one or more substituents. Examples of the substituents are those described for the substituents of the methine moiety. Preferred examples of the substituents are the same as those described for the substituents of the methine moiety.

Preferred examples of the alkyl groups for $R^3$ and $R^4$ are linear or cyclic alkyl groups which have 1 to 20 carbon atoms and which can have one or more substituents (e.g., methyl, ethyl, propyl, isopropyl, n-butyl, isobutyl, sec-butyl, tert-butyl, methoxyethyl, hydroxyethyl, pentyl, isopentyl, and cyclohexyl). Most preferred alkyl groups are alkyl groups having 1 to 6 carbon atoms (particularly, methyl, ethyl, methoxyethyl, and n-butyl).

Preferred examples of the aryl groups for $R^3$ and $R^4$ are aryl groups which have 6 to 18 carbon atoms and which can have one or more substituents (e.g., phenyl, 1-naphthyl, 2-naphthyl, and 1-anthracenyl). More preferred are phenyl, 1-naphthyl, and 2-naphthyl. Most preferred is phenyl.

Preferred examples of the aralkyl groups for $R^3$ and $R^4$ are aralkyl groups which have 7 to 18 carbon atoms and which can have one or more substituents (e.g., benzyl, phenethyl, and anisyl). Most preferred is benzyl.

Preferred examples of the heterocyclic groups for $R^3$ and $R^4$ are saturated or unsaturated heterocyclic groups having 4 to 7 carbon atoms. The hetero atoms preferably are a nitrogen atom, an oxygen atom, and a sulfur atom. Examples are 4-pyridyl, 2-pyridyl, 2-pyrazinyl, 2-imidazoyl, 2-furyl, 2-thiophenyl, 2-benzoxazolyl, and 2-benzothioxazoly. The heterocyclic groups for $R^3$ and $R^4$ preferably are 5- or 6-membered nitrogen atom-containing heterocyclic groups.

In the formula (I), each of $R^3$ and $R^4$ preferably is an alkyl group, an aryl group, or an aralkyl group. It is more preferred that at least one of $R^3$ and $R^4$ is an alkyl group.

$R^1$, $R^2$, $R^3$, and $R^4$ of the formula (I) can have one or more substituents. Examples of the substituents are described below.

A linear or cyclic alkyl group having 1 to 20 carbon atoms (e.g., methyl, ethyl, isopropyl, and cyclohexyl), an aryl group which has 6 to 18 carbon atoms and which can have one or more substituents (e.g., phenyl, chlorophenyl, 2,4-di-t-amylphenyl, and 1-naphthyl), an aralkyl group which has 7 to 18 carbon atoms and which can have one or more substituents (e.g., benzyl and anisyl), an alkenyl group having 2 to 20 carbon atoms (e.g., vinyl and 2-methylvinyl), an alkynyl group having 2 to 20 carbon atoms (e.g., ethynyl, 2-methylethynyl, and 2-phenylethynyl), a halogen atom (e.g., F, Cl, Br, and I), a cyano group, a hydroxyl group, a carboxyl group, an acyl group having 2 to 20 carbon atoms (e.g., acetyl, benzoyl, salicyloyl, and pivaloyl), an alkoxy group having 1 to 20 carbon atoms (e.g., methoxy, butoxy, and cyclohexyloxy), an aryloxy group having 6 to 20 carbon atoms (e.g., phenoxy, 1-naphthoxy, and toluoyl), an alkylthio group having 1 to 20 carbon atoms (e.g., methylthio, butylthio, benzylthio, and 3-methoxypropylthio), an arylthio group having 6 to 20 carbon atoms (e.g., phenylthio and 4-chlorophenylthio), an alkylsulfonyl group having 1 to 20 carbon atoms (e.g., methanesulfonyl and butanesulfonyl), an arylsulfonyl group having 6 to 20 carbon atoms (e.g., benzenesulfonyl and p-toluenesulfonyl), a carbamoyl group having 1 to 10 carbon atoms (e.g., unsubstituted carbamoyl, methylcarbamoyl, ethylcarbamoyl, n-butylcarbamoyl, and dimethylcarbamoyl), an amide group having 1 to 10 carbon atoms (e.g., acetamide and benzamide), an acyloxy group having 2 to 10 carbon atoms (e.g., acetoxy and benzoyloxy), an alkoxycarbonyl group having 2 to 10 carbon atoms (e.g., methoxycarbonyl and ethoxycarbonyl), and a 5- or 6-membered heterocyclic group (e.g., an aromatic heterocyclic ring such as pyridyl, thienyl, furyl, thiazolyl, imidazolyl, or pyrazolyl; and other heterocyclic ring such as a ring of pyrrolidine, piperidine, morpholine, pyran, thiopyran, dioxane, or dithiolane).

Preferred substituents are an alkyl group having 1 to 6 carbon atoms (particularly, methyl), an aryl group having 6 to 10 carbon atoms (particularly, phenyl), an alkoxy group having 1 to 10 carbon atoms (particularly, methoxy), and a halogen atom (particularly, chlorine). Most preferred is an alkyl group having 1 to 4 carbon atoms.

In the formula (I), each set of $R^1$ and $R^2$, $R^2$ and a substituent of $L^1$, $R^2$ and a substituent of $L^2$, $R^2$ and a substituent of $L^3$, a substituent of $L^1$ and $R^3$, a substituent of $L^2$ and $R^3$, a substituent of $L^3$ and $R^3$, and $R^3$ and $R^4$ can be connected to each other to form a ring structure. Examples of the ring structures are illustrated below by the chemical formulas. In the below-illustrated formulas, Ra and Rb are substituents such as those described hereinbefore for $R^1$ through $R^4$. Preferred examples of the substituents are an alkyl group (e.g., methyl) and an aryl group (e.g., phenyl). The below-illustrated ring structure can be condensed or fused with other ring structures, and two or more ring structures can be present in one dye compound.

(1) Examples of ring structures formed where $R^1$ and $R^2$ are connected to each other

A-1

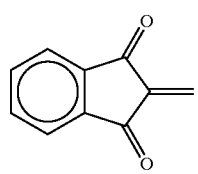

A-2

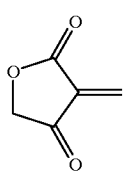

A-3

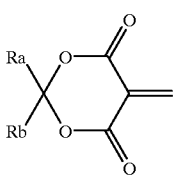

A-4

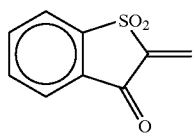

A-5

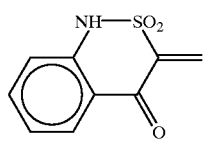

A-6

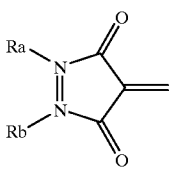

A-7

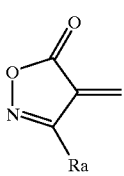

A-8

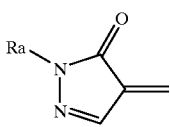

(2) An example of ring structure formed where $R^2$ and a substituent of $L^2$ are connected to each other ($L^1$ is included in the ring structure)

A-9

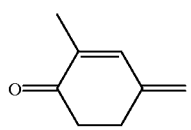

(3) An example of ring structure formed where $R^2$ and a substituent of $L^3$ are connected to each other ($L^1$ and $L^2$ are included in the ring structure)

A-10

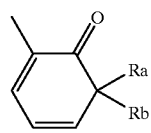

(4) An example of ring structure formed where a substituent of $L^1$ and $R^3$ are connected to each other ($L^2$ and $L^3$ are included in the ring structure)

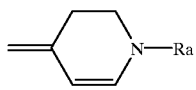

A-11

(5) An example of ring structure formed where a substituent of $L^2$ and $R^3$ are connected to each other ($L^3$ is included in the ring structure)

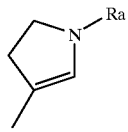

A-12

(6) Examples of ring structure formed where a substituent of $L^3$ and $R^3$ are connected to each other

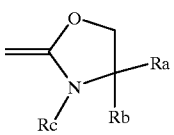

A-13

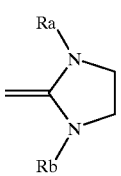

A-14

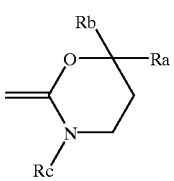

A-15

(7) Examples of ring structures formed where $R^3$ and $R^4$ are connected to each other

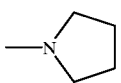

A-16

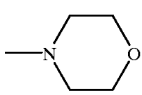

A-17

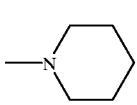

A-18

The dye compound utilized for the formation of the recording layer of the optical recording medium of the invention preferably is a dye compound having one of the aforementioned formulas (I-A), (I-B), (I-C), (I-D), and (I-E)

(1) In the formula (I-A), $Z^1$ stands for a group of atoms required for forming a 5- or 6-membered carbon ring or heterocyclic ring structure which can have one or more substituents. Examples of the carbon rings and heterocyclic rings are those described hereinbefore for the rings formed by the combination of $R^1$ and $R^2$. Most preferred are the above-illustrated ring groups of A-1, A-3, A-4, and A-7.

As for $L^1$, $L^2$, and $L^3$ of the formula (I-A), the aforementioned descriptions for the $L^1$, $L^2$, and $L^3$ of the formula (I) are adopted.

Preferred examples of the alkyl groups for $R^3$ and $R^4$ are linear or cyclic alkyl groups having 1 to 6 carbon atoms (particularly, methyl, ethyl, methoxyethyl, hydroxyethyl, and cyclohexyl). Preferred examples of the aryl groups for $R^3$ and $R^4$ are aryl groups having 6 to 18 carbon atoms (particularly, phenyl, 1-naphthyl, or 2-naphthyl). Preferred examples of the aralkyl groups for $R^3$ and $R^4$ are aralkyl groups having 6 to 10 carbon atoms (particularly, benzyl). It is preferred that at least one of $R^3$ and $R^4$ is an alkyl group.

(2) In the formula (I-B), preferred examples of $R^1$, $R^2$, $L^1$, $L^2$, and $L^3$ are those described for the formula (I) As for $R^1$ and $R^2$, most preferred are a cyano group, an acyl group (e.g., acetyl), an alkoxycarbonyl group (e.g., ethoxycarbonyl), an arylsulfonyl group (e.g., benzenesulfonyl), and a carbamoyl group (e.g., phenylcarbamoyl).

Preferred examples of the 5- or 6-membered nitrogen atom-containing heterocyclic rings which contain $Z^2$ are those described hereinbefore for the rings formed by the combination of $R^3$ and $R^4$. Most preferred are the above-illustrated ring groups of A-16 and A-17.

(3) In the formula (I-C), examples of the 5- or 6-membered carbon ring or heterocyclic rings which contain $Z^3$ are those described hereinbefore for the rings formed by the combination of $R^1$ and $R^2$. Most preferred are the above-illustrated ring groups of A-5 and A-7.

Preferred examples of the 5- or 6-membered nitrogen atom-containing heterocyclic rings which contain $Z^4$ are those described hereinbefore for the rings formed by the combination of $R^3$ and $R^4$. Most preferred is the above-illustrated ring group of A-18.

As for $L^1$, $L^2$, and $L^3$ of the formula (I-C), the aforementioned descriptions for the $L^1$, $L^2$, and $L^3$ of the formula (I) are adopted.

(4) In the formula (I-D), preferred examples of $R^1$, $R^3$, $R^4$, $L^1$, $L^2$, and $L^3$ are those described for the formula (I). As for $R^1$ and $R^2$, most preferred are a cyano group, an acyl group (e.g., acetyl and pivaloyl), and an alkoxycarbonyl group (e.g., decyloxycarbonyl).

Preferred examples of the 5- or 6-membered nitrogen atom-containing heterocyclic rings which contain $Z^5$ are those described hereinbefore for the rings formed by the combination of a substituent of $L^3$ and $R^3$. Most preferred is the above-illustrated ring group of A-13. The alkyl group for $R^4$ preferably is an alkyl group having 1 to 6 carbon atoms (e.g., methyl and isopropyl).

(5) In the formula (I-E), examples and preferred examples of $R^1$, $L^1$, $L^2$, and $L^3$ are those described for the formula (I). As for $R^1$, most preferred are an alkoxycarbonyl group (e.g., ethoxycarbonyl) and an arylsulfonyl group (e.g., phenylsulfonyl).

A preferred example of the 5- or 6-membered carbon ring or heterocyclic ring which contains $Z^6$ is that described hereinbefore for the rings formed by the combination of $R^2$ and a substituent of $L^2$, that is the ring group of A-9.

It is preferred that each of $R^3$ and $R^4$ is an alkyl group (e.g., methyl and isoamyl), and that $R^3$ and $R^4$ are connected to each other to form a ring structure. Preferred ring structures are the same as those formed by the combination of $R^3$ and $R^4$.

The dye compound of the formula (I) may be present in any polymeric form in which one formula (I) is connected to other one or more formula (I) at any positions. Otherwise, the formula (I) can be combined with a polymer chain such as chain of polystyrene, polymethacrylate, polyvinyl alcohol or cellulose.

Preferred dye compounds of the formula (I) are illustrated by the following non-limiting formulas.

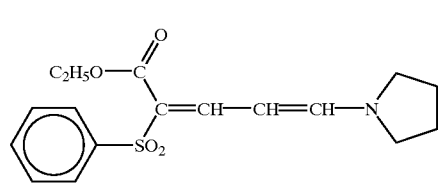
(I-1)

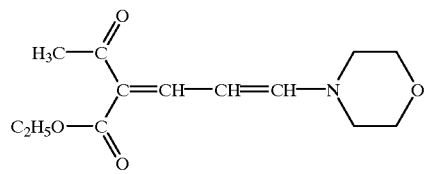
(I-2)

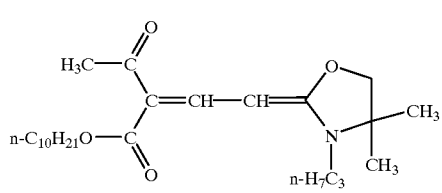
(I-3)

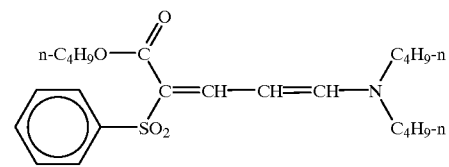
(I-4)

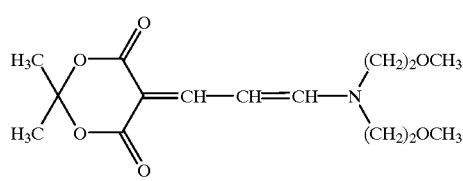
(I-5)

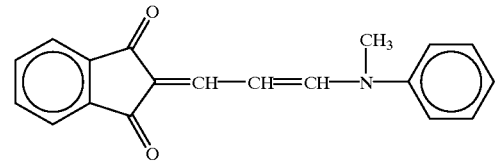
(I-6)

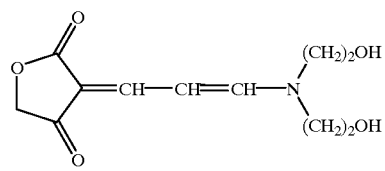
(I-7)

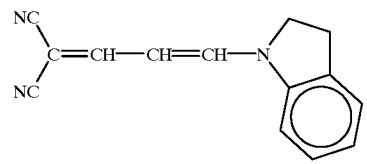
(I-8)

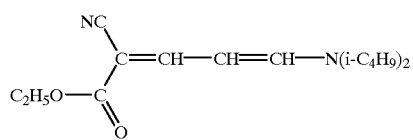
(I-9)

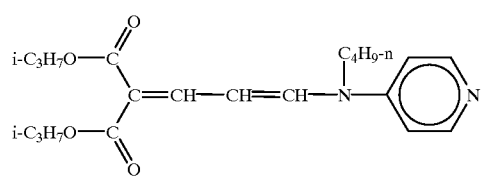
(I-10)

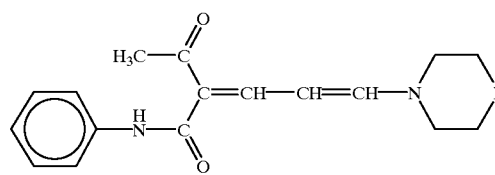
(I-11)

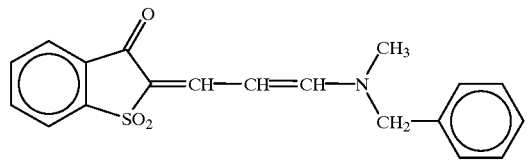
(I-12)

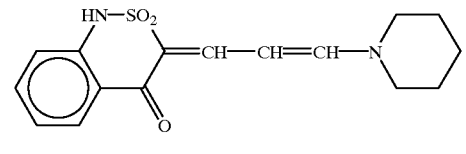
(I-13)

-continued
(I-14)
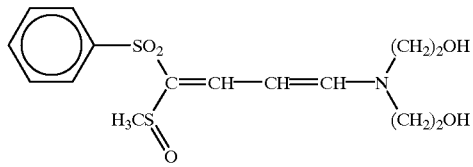
(I-15)
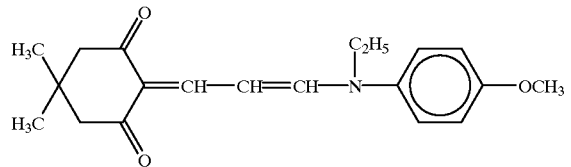
(I-16)
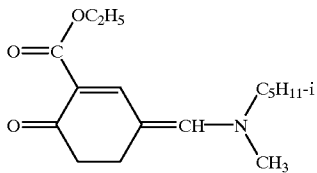
(I-17)
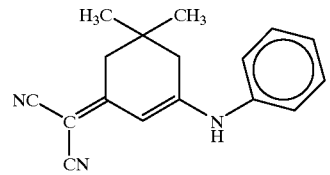
(I-18)
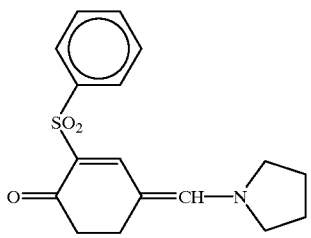
(I-19)
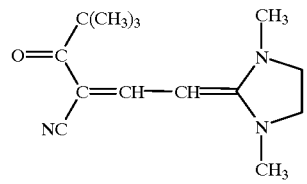
(I-20)
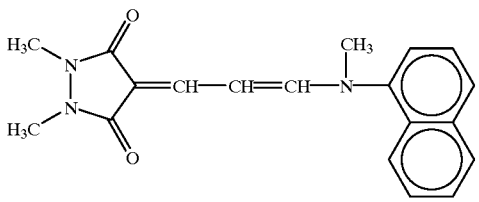
(I-21)
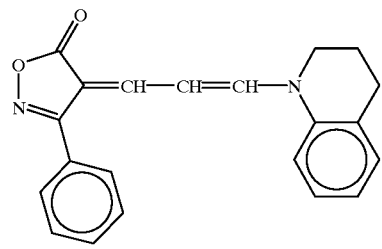
(I-22)
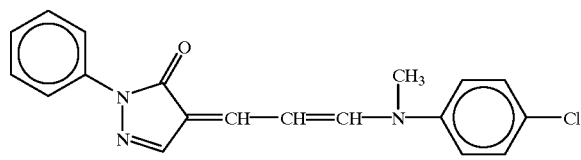
(I-23)
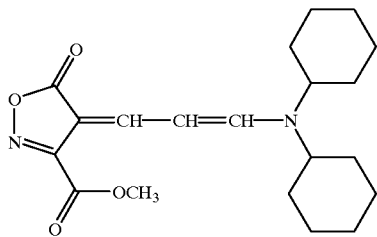
(I-24)
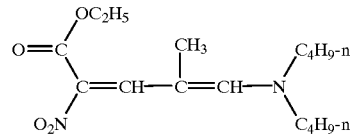
(I-25)
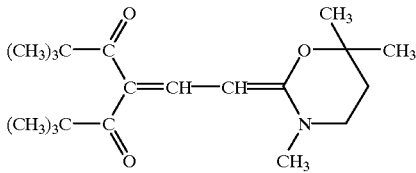
(I-26)
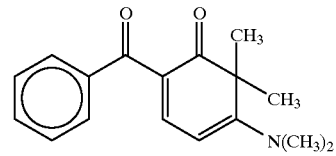

-continued

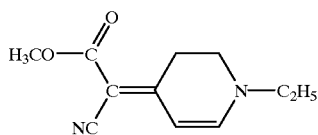
(I-27)

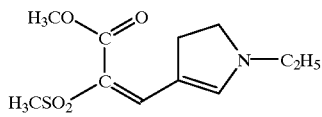
(I-28)

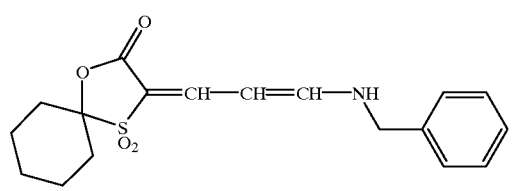
(I-29)

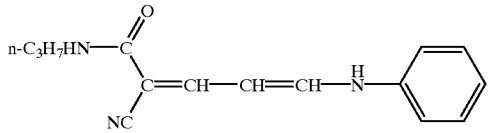
(I-30)

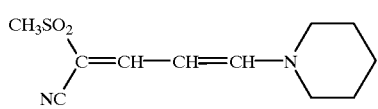
(I-31)

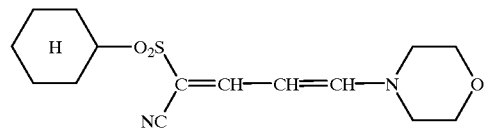
(I-32)

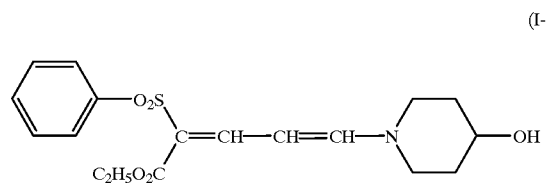
(I-33)

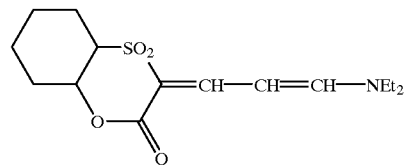
(I-34)

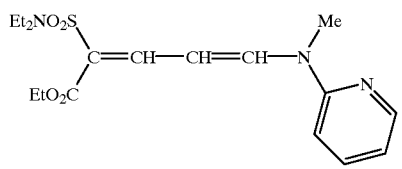
(I-35)

The dye compounds of the formula (I) can be prepared by the processes described in Japanese Patent Publications No.57-19767, No.58-26016, and No.61-57619, and U.S. Pat. No. 4,163,671, or their analogous processes.

Examples of the processes for preparing the dye compounds of the formula (I) are described below.

[Preparation of Compound (I-1)]

Compound (I-1) was prepared according to the below-illustrated reaction scheme.

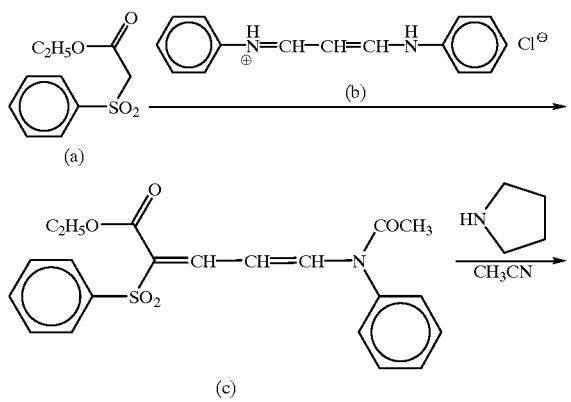

-continued

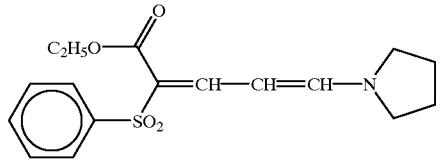
(I-1)

(1) Preparation of Compound (c)

In 50 mL of acetic anhydride were dispersed 28.6 g of phenylsulfonylacetonitrile (a) and 23.3 g of the compound (b), and the resulting mixture was refluxed under heating for one hour. The reaction solvent was distilled off under reduced pressure using an aspirator. The residual crude product was recrystallized from isopropanol, to obtain 41.0 g of the desired compound (c) as a pale yellow crystalline product.

(2) Preparation of Compound (I-1)

In 25 mL of acetonitrile were dispersed 20.0 g of the compound (c) obtained above and 3.50 g of pyrrolidine, and the resulting mixture was refluxed under heating for 30 minutes. The reaction mixture was allowed to stand for spontaneous cooling and to the cooled reaction mixture were successively added 20 mL of isopropanol and 100 mL of water. The precipitated crystalline product was collected by filtration, washed with a mixture of isopropanol and water (1/5), and dried to obtain 20.3 g of the desired compound (I-1) as a yellow crystalline product.

Other dye compounds can be easily prepared by analogous preparation processes.

The optical information recording medium of the invention has on a substrate a recording layer comprising a dye compound of the aforementioned formula (I). The optical information recording medium of the invention can take various structures. Preferably, the recording medium of the invention comprises on a substrate disc having a pre-groove of a predetermined pitch the recording layer, a light-reflecting layer, and a protective layer. It is also preferred that the recording medium of the invention comprises on the substrate a light-reflecting layer, the recording layer, and a protective layer. Further, it is also preferred that a pair of recording units each having a substrate, the recording layer, and a light-reflecting layer are combined with each other under such condition that the recording layers are placed between the substrates.

In order to increase the recording density as compared with CD-R and DVD-R, the recording medium of the invention can have a substrate on which a pre-groove having a narrower track pitch. It is preferred that the substrate of the recording medium of the invention has a pre-groove of 0.2 to 0.8 µm, more preferably 0.25 to 0.8 µm, most preferably 0.27 to 0.4 µm. The depth of the pre-groove on the substrate preferably is in the range of 0.03 to 0.18 µm, more preferably 0.05 to 0.15 µm, most preferably 0.06 to 0.1 µm.

The production of the optical information recording medium of the invention is described below by referring to a structure comprising a substrate disc, a recording layer, a light-reflecting layer, and a protective layer.

The substrate can be produced using known material. Examples of the materials for the substrate include glass, polycarbonate, acrylic resin such as polymethyl methacrylate, vinyl chloride resin such as polyvinyl chloride or vinyl chloride copolymer, epoxy resin, amorphous polyolefin, and polyester. If desired, these materials can be employed in combination. The substrate may be in the form of a flexible film or a rigid plate. From the points of view of anti-humidity characteristics, dimensional stability and cost, polycarbonate is preferred.

On the surface of the substrate on which the recording layer is placed, a subbing layer can be provided for smoothing the surface plane, increasing adhesiveness, and keeping the recording layer from deterioration. The subbing layer can be made of polymer materials such as polymethyl methacrylate, acrylate/methacrylate copolymer, styrene/maleic anhydride copolymer, polyvinyl alcohol, poly-N-methylolacrylamide, styrene/vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, polyethylene, polypropylene, and polycarbonate, and silane-coupling agents. The subbing layer can be formed on the substrate by coating a solution or dispersion of the above-mentioned material in an appropriate solvent on the surface of the substrate by a known coating method such as spin-coating, dip-coating, or extrusion-coating. The subbing layer generally has a thickness of 0.005 to 20 µm, preferably 0.01 to 10 µm.

The recording layer can be formed on by coating a solution of the dye compound in a solvent on the substrate or on the subbing layer. In the solution of the dye compound, a quencher and a binder can be dissolved, if desired. Examples of the solvents for the coating solution include esters such as butyl acetate and cellosolve acetate; ketones such as methyl ethyl ketone, cyclohexanone, and methyl isobutyl ketone; chlorinated hydrocarbons such as dichloromethane, 1,2-dichloroethane, and chloroform; amides such as dimethylformamide; hydrocarbons such as cyclohexane; ethers such as tetrahydrofuran, diethyl ether, and dioxane; alcohols such as ethanol, n-propanol, isopropanol, n-butanol, and diacetone alcohol; fluorine atom-containing solvents such as 2,2,3,3-tetrafluropropanol; and glycol ethers such as ethylene glycol monomethyl ether, ethylene glycol monoethyl ether, and propylene glycol monomethyl ether.

The above-mentioned solvents can be employed singly or in combination, in consideration of the solubility of the dye compound to be dissolved. The dye solution can further contain an oxidation inhibitor, a UV absorber, a plasticizer, and a lubricant.

The binder which may be contained in the dye compound solution can be a polymer material of natural origin such as gelatin, a cellulose derivative, dextran, rosin, or rubber; or a synthetic polymer material such as a hydrocarbon resin (e.g., polyethylene, polypropylene, polystyrene, or polyisobutyrene), a vinyl resin (e.g., polyvinyl chloride, polyvinylidene chloride, or vinyl chloride/vinyl acetate copolymer), an acrylic resin (e.g., polymethyl acrylate or polymethyl methacrylate), polyvinyl alcohol, chlorinated polyethylene, an epoxy resin, a buryral resin, a rubber derivative, or a primary condensate of heat-curing resin (e.g., phenol/formaldehyde resin). The binder can be employed 0.01 to 50. weight parts, preferably 0.1 to 5 weight parts, per one weight part of the dye compound. The concentration of the dye compound in the coating solution generally is in the range of 0.01 to 10 weight %, preferably 0.1 to 5 weight %.

The coating is generally performed by spray-coating, spin-coating, dip-coating, roll-coating-, blade-coating, doctor roll-coating, or screen-printing.

The recording layer can be a single layer or a multiple layer, and generally has a thickness of 20 to 500 nm, preferably 30 to 300 nm, more preferably 50 to 300 nm, most preferably 50 to 100 nm.

The recording layer can contain a anti-fading agent so as to improve resistance to light. A representative anti-fading agent is a singlet oxygen quencher such as that described in the known patent publications. Examples of the patent publications include Japanese Patent Provisional Publications No.58-175693, No.59-81194, No.60-18387, No.60-19586, No.60-19587, No.60-35054, No.60-36190, No.60-36191, No.60-44554, No.60-44555, No.60-44389, No.60-44390, No.60-54892, No.60-47069, No.63-209995, and No. H4-25492; Japanese Patent Publications No.H1-38680 and No.H6-26028; and German Patent No.350,399. The singlet oxygen quencher is also described in Bulletin of Japan Chemical Society (in Japanese) October, pp.1141 (1992).

An example of a preferred singlet oxygen quencher is illustrated by the following formula (II):

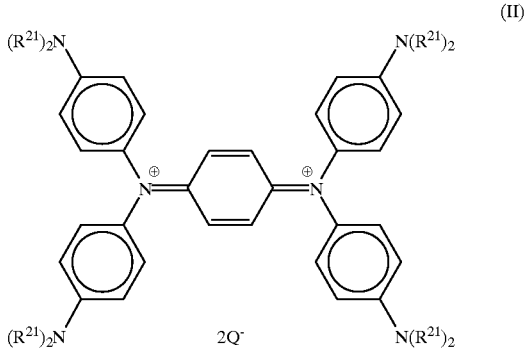

(II)

In the formula (II), $R^{21}$ is an alkyl group which can have one or more substituents, and $Q^{3\hbox{-}}$ represents an anion. In more detail, $R^{21}$ generally is an alkyl group which has 1 to 8 carbon atoms and which can have substituents. Preferred is an alkyl group which has 1 to 6 carbon atoms and which has no substituents. Examples of the substituents include a halogen atom (e.g., F and Cl), an alkoxy group (e.g., methoxy and ethoxy), an alkylthio group (e.g., methylthio and ethylthio), an acyl group (e.g., acetyl and propionyl), a hydroxyl group, an alkoxycarbonyl group (e.g., methylcarbonyl and ethoxycarbonyl), an alkenyl group (e.g., vinyl), and an aryl group (e.g., phenyl and naphthyl). Preferred are a halogen atom, an alkoxy group, an alkylthio group, and an alkoxycarbonyl group. The anion for $Q^-$ preferably is $ClO_4^-$, $AsF_6^-$, $BF_4^-$, or $SbF_6^-$.

Representative compounds of the formula (II) are set forth in Table 1.

TABLE 1

| Compound No. | $R^{21}$ | $Q^-$ |
|---|---|---|
| II-1 | $CH_3$ | $ClO_4^-$ |
| II-2 | $C_2H_5$ | $ClO_4^-$ |
| II-3 | n-$C_3H_7$ | $ClO_4^-$ |
| II-4 | n-$C_4H_9$ | $ClO_4^-$ |
| II-5 | n-$C_5H_{11}$ | $ClO_4^-$ |
| II-6 | n-$C_4H_9$ | $SbF_6^-$ |
| II-7 | n-$C_4H_9$ | $BF_4^-$ |
| II-8 | n-$C_4H_9$ | $AsF_6^-$ |

The singlet oxygen quencher is generally employed in an amount of 0.1 to 50 weight parts, preferably 0.5 to 45 weight parts, more preferably 5 to 25 weight parts, per 100 weight parts of the dye compound.

On or just below the recording layer, a light-reflecting layer is preferably placed for increasing the light-reflection in the procedure of reproducing the recorded information. The light-reflecting layer comprises material which shows a high light reflection to the laser beam. Examples of the materials showing a high light reflection include metals and semi-metals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, and Bi. Stainless steel is also employable. The above-mentioned metals and semi-metals can be employed singly or in combination. Alloy containing the metal and semi-metal can be also employed. Preferred are Cr, Ni, Pt, Cu, Ag, Au, Al, their alloys, and stainless steel. More preferred are Au metal, Ag metal, Al metal, and their alloys. Most preferred are Ag metal, Al metal, and their alloys.

The light-reflecting layer can be formed by vacuum-depositing, sputtering, or ion-plating the above-mentioned light-reflecting material on the substrate or the recording layer. The light-reflecting layer generally has a thickness in the range of 10 to 300 nm, preferably 50 to 200 nm.

On the light-reflecting layer or the recording layer is preferably provided a protective layer so as to keep thelight-reflecting layer and the recording layer from physical damage or chemical deterioration. The protective layer may be not required if the two recording units having a recording layer on a substrate are combined to place the recording layer(s) between the substrates, such as, in the case of DVD-R. The protective layer may be made of inorganic material such as SiO, $SiO_2$, $MgF_2$, $SnO_2$, or $Si_3N_4$; or organic material such as thermoplastic resin, heat-curing resin, or UV-curing resin. The protective layer can be formed by laminating a separately prepared plastic material film (for instance, by extrusion) on the light-reflecting layer or the recording layer via an adhesive. The protective layer can be. formed by vacuum deposition, sputtering, or coating. A. protective layer of a thermoplastic resin or a heat-curing resin can be formed by coating a solution of the resin on the light-reflecting layer or the recording layer, and drying the coated solution. A protective layer of a UV-curing resin can be formed by coating the UV-curing resin or a solution of the UV-curing resin on the light-reflecting layer or the recording layer, and curing by irradiation of UV light. The solution for formation of the protective layer can contain one or more additives such as a anti-static agent, an oxidation inhibitor, and a UV absorber. The protective layer generally has a thickness in the range of 0.1 $\mu$m to 1 mm, preferably 0.1 to 100 $\mu$m.

According to the above-described process, a composite unit for recording (i.e., recording unit) which has, on a substrate, a recording layer, a light-reflecting layer, and a protective layer, or a composite unit for recording which has, on a substrate, a light-reflecting layer, a recording layer, and a protective layer can be produced.

The optical recording medium of the invention can be utilized, for instance, in the following optical recording system.

The recording medium is rotated at a constant linear rate (for instance, 1.2 to 1.4 m/sec., according to CD format) or a constant angular rate, and a recording light such as a semi-conductor laser light is applied on the recording layer through the substrate or the protective layer. The recording layer absorbs the laser light to elevate its temperature, and then is physically or chemically deformed or changed (such as formation of pits) to show change of optical characteristics, whereby the information is recorded in the recording medium.

The optical information recording medium of the invention is particularly advantageously employed in an optical information recording process utilizing a semiconductor laser light in the wavelength region of 390 to 550 nm. Preferred examples of the light sources include a blue-violet semiconductor laser light having a wavelength region of 390 to 415 nm, a blue-green semiconductor laser light having a central oscillation wavelength of 515 nm, and a blue-violet SHG laser light having a central oscillation wavelength of 425 nm which is obtained from an infrared semiconductor laser light having a central oscillation wavelength of 850 nm by reducing the wavelength to a half by means of an optical waveguide element. The blue-violet semiconductor light and the SHG laser light are preferred from the viewpoint of the recording density.

The reproduction of the recorded information can be performed by rotating the recording medium at a constant linear rate or angular rate equivalent to the that employed in the recording procedure, and applying the semiconductor laser light to the recording medium at the substrate side or the protective layer side.

The present invention is further described by the following examples.

EXAMPLE 1

The dye compound (I-1) was dissolved in 2,2,3,3-tetrafluoropropanol to prepare a dye solution for recording layer (concentration: 1 wt. %). The dye solution was coated on a polycarbonate substrate disc (diameter: 120 mm, thickness: 0.6 mm) having a spiral pre-groove (track pitch: 0.4 μm, groove width: 0.2 μm, depth of groove: 0.08 μm, which was produced in the injection molding procedure) on its surface by spin-coating, to give a recording dye layer (thickness in the pregroove: approx. 80 nm).

On the recording dye layer was sputtered silver to form a light-reflecting layer having a thickness of approx. 100 nm. On the light-reflecting layer was coated a UV curing resin (SD 318, available from Dainippon Ink and Chemicals, Co., Ltd.). The coated UV resin was irradiated with UV rays to give a protective layer having a thickness of 7 μm.

Thus, an optical recording disc of the invention was produced.

EXAMPLES 2 to 10

The procedures of Example 1 were repeated except for replacing the dye compound (I-1) with the same amount of the dye compounds set forth in Table 2, to produce optical recording discs of the invention.

Comparison Examples 1 to 11

The procedures of Example 1 were repeated except for replacing the dye compound (I-1) with the same amount of the below-described comparative dye compounds a to k, to produce optical recording discs for comparison.

Comparative Dye Compound a
[dye compound employed in Example 1 of Japanese Patent Provisional Publication No.8-127174]

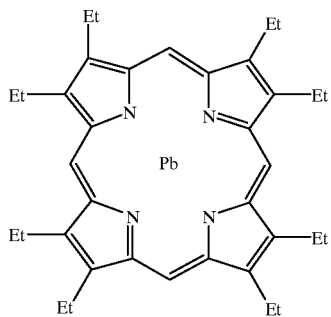

Comparative Dye Compound b
[dye compound (a) of Japanese Patent Provisional Publication No.11-53758]

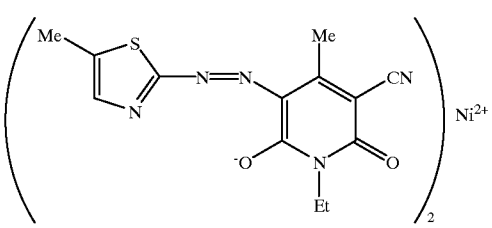

Comparative Dye Compound c
[dye compound (b) of Japanese Patent Provisional Publication No.11-53758]

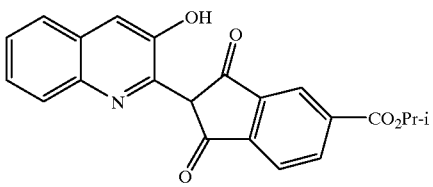

Comparative Dye Compound d
[dye compound (c) of Japanese Patent Provisional Publication No.11-53758]

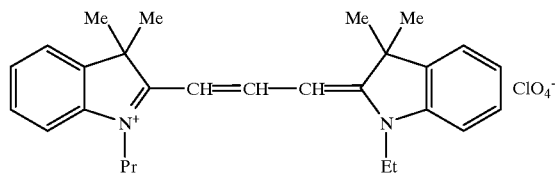

Comparative Dye Compound e
[dye compound (V) of Japanese Patent Provisional Publication No.11-334204]

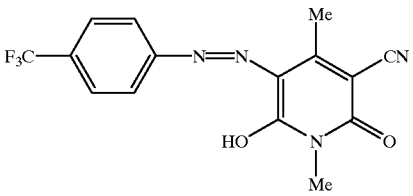

Comparative Dye Compound f
[dye compound (III) of Japanese Patent Provisional Publication No.11-334205]

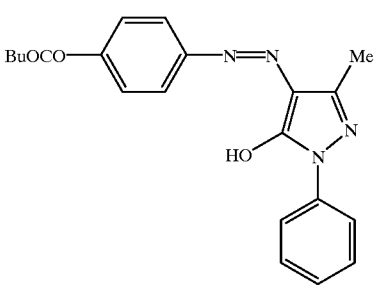

Comparative Dye Compound g

[dye compound (V) of Japanese Patent Provisional Publication No.11-334206]

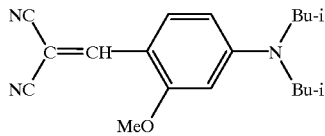

Comparative Dye Compound h

[dye compound (19) of Japanese Patent Provisional Publication No.11-334207]

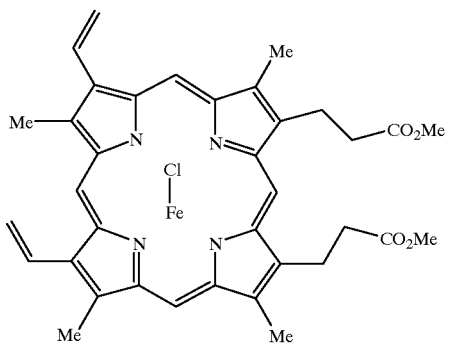

Comparative Dye Compound i

[dye compound (5) of Japanese Patent Provisional Publication No.2000-43423]

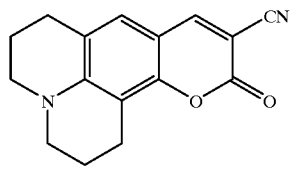

Comparative Dye Compound j

[dye compound (1-1) of Japanese Patent Provisional Publication No.2000-108513]

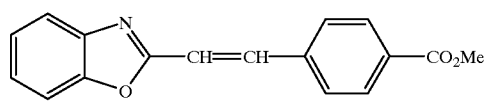

Comparative Dye Compound k

[dye compound (1-1) of Japanese Patent Provisional Publication No.2000-149320]

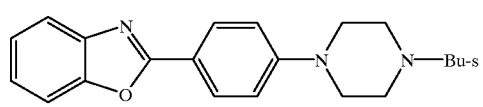

The Hamett's substituent constant $\sigma_p$ of each dye compound employed in each of Examples 1 to 12 is set forth in Table 2.

TABLE 2

| Dye compound of | Hammett's substituent constant $\sigma_p$ | |
|---|---|---|
| Recording layer | $R^1$ | $R^2$ |
| Example 1 (I-1) | 0.45 (COOC$_2$H$_5$) | 0.68 (SO$_2$-phenyl) |
| Example 2 (I-2) | 0.50 (OCCH$_3$) | 0.45 (COOC$_2$H$_5$) |
| Example 3 (I-3) | 0.50 (OCCH$_3$) | 0.45 (COOC$_{10}$H$_{21}$) |
| Example 4 (I-5) | 0.45 | 0.45 |
| Example 5 (I-6) | 0.43 | 0.43 |
| Example 6 (I-10) | 0.45 (COOC$_3$H$_7$-i) | 0.45 (COOC$_3$H$_7$-i) |
| Example 7 (I-12) | 0.68 | 0.43 |
| Example 8 (I-17) | 0.66 (CN) | 0.66 (CN) |
| Example 9 (I-18) | 0.68 (SO$_2$-phenyl) | 0.50 |
| Example 10 (I-21) | 0.45 | 0.50 |
| Example 11 (I-30) | 0.66 (CN) | 0.36 (CONHC$_3$H$_7$-n) |
| Example 12 (I-31) | 0.66 (CN) | 0.72 (SO$_2$CH$_3$) |

Evaluation of Optical Recording Disc

The optical recording disc of each of Examples and Comparison Examples was rotated at a constant linear rate of 3.5 m/sec., and a blue-violet semiconductor laser light (oscillation wavelength: 405 nm) was applied to the recording disc to record 14T-EFM signals. Thereafter, the recorded signals were reproduced.

The recording and reproducing characteristics such as a modulation, a groove light-reflection, and a sensitivity at an optimum power were determined by means of DDU 1000 (available from Palstick Corporation). The results are set forth in Table 3.

TABLE 3

| Dye compound of Recording layer | Reflection (%) (Non-recorded area) | Modulation (%) | Sensitivity (mW) |
|---|---|---|---|
| Example 1 (I-1) | 74 | 66 | 6.5 |
| Example 2 (I-2) | 70 | 60 | 6.7 |
| Example 3 (I-3) | 71 | 61 | 7.1 |
| Example 4 (I-5) | 70 | 60 | 6.8 |
| Example 5 (I-6) | 69 | 58 | 7.0 |
| Example 6 (I-10) | 72 | 62 | 7.1 |
| Example 7 (I-12) | 71 | 65 | 6.5 |
| Example 8 (I-17) | 81 | 60 | 6.8 |
| Example 9 (I-18) | 70 | 61 | 7.1 |
| Example 10 (I-21) | 67 | 63 | 5.5 |
| Example 11 (I-30) | 77 | 60 | 8.1 |
| Example 12 (I-31) | 80 | 65 | 7.0 |
| Com. Ex. 1 a | 30 | 61 | 9.0 |
| Com. Ex. 2 b | 35 | 42 | 9.5 |
| Com. Ex. 3 c | 62 | 55 | 8.8 |
| Com. Ex. 4 d | 28 | 60 | 9.3 |
| Com. Ex. 5 e | 37 | 41 | 9.1 |
| Com. Ex. 6 f | 38 | 39 | 8.7 |
| Com. Ex. 7 g | 41 | 52 | 8.8 |
| Com. Ex. 8 h | 33 | 60 | 9.2 |
| Com. Ex. 9 i | 35 | 39 | 8.5 |
| Com. Ex. 10 j | 60 | 58 | 8.5 |
| Com. Ex. 11 k | 52 | 55 | 8.7 |

From the results set forth in Table 3, the optical recording discs of the invention (Examples 1 to 12) having a recording layer of the dye compound of the formula (I) are superior to the optical recording discs for comparison parison (Comparison Examples 1 to 11) having a recording layer of any one of the comparative dye compounds a to k, in their higher light-reflection, higher modulation, and higher sensitivity.

The above-mentioned results indicate that an optical information recording medium having a recording layer which comprises the dye compound of the formula (I) is favorably utilized for recording information in a higher density using a short wavelength laser light.

EXAMPLE 13

The dye compound (I-1) was dissolved in 2,2,3,3-tetrafluoropropanol to prepare a dye solution for recording layer (concentration: 1 wt. %). The dye solution was coated on a polycarbonate substrate disc (diameter: 120 mm, thickness: 0.6 mm) having a spiral pre-groove (track pitch: 0.4 μm, groove width: 0.2 μm, depth of groove: 0.08 μm, which was produced in the injection molding procedure) on its surface by spin-coating, to give a recording dye layer (thickness in the pregroove: approx. 120 nm). On the recording dye layer was sputtered silver to form a light-reflecting layer having a thickness of approx. 100 nm. On the light-reflecting layer was coated a UV curing resin (SD 318, available from Dainippon Ink and Chemicals, Co., Ltd.). The coated UV resin was irradiated with UV rays to give a protective layer having a thickness of 7 μm.

Thus, an optical recording disc of the invention was produced.

EXAMPLES 14 to 22

The procedures of Example 13 were repeated except for replacing the dye compound (I-1) with the same amount of the dye compounds set forth in Table 4, to produce optical recording discs of the invention.

Comparison Examples 12 to 15

The procedures of Example 1 were repeated except for replacing the dye compound (I-1) with the same amount of the below-described comparative dye compounds A to D, to produce optical recording discs for comparison.

Comparative Dye Compound A

[dye compound (a) of Japanese Patent Provisional Publication No.11-53758]

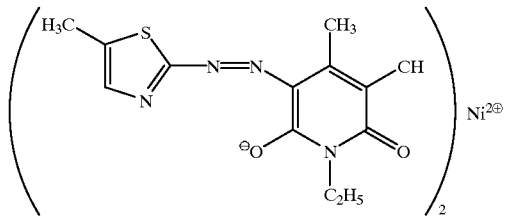

Comparative Dye Compound B

[dye compound (b) of Japanese Patent Provisional Publication No.11-53758]

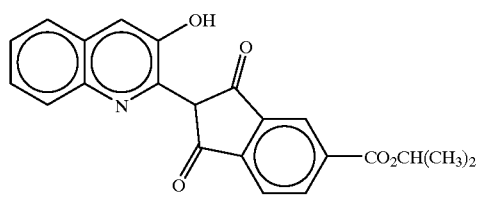

Comparative Dye Compound C

[dye compound (c) of Japanese Patent Provisional Publication No.11-53758]

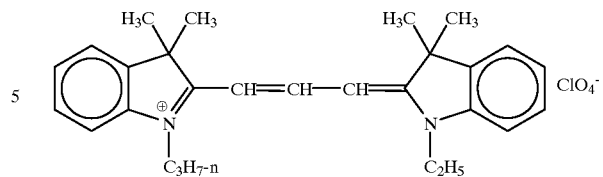

Comparative Dye Compound D

[dye compound (f) of Japanese Patent Provisional Publication No.11-53758]

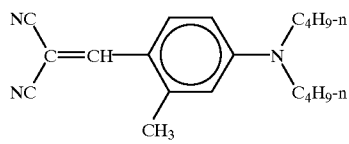

The Hamett's substituent constant $\sigma_p$ of each dye compound employed in each of Examples 13 to 22 is set forth in Table 4.

TABLE 4

| Dye compound of Recording layer | Hammett's substituent constant $\sigma_p$ | |
|---|---|---|
| | $R^1$ | $R^2$ |
| Example 13 (I-1) | 0.45 (COOC$_2$H$_5$) | 0.68 (SO$_2$-phenyl) |
| Example 14 (I-2) | 0.50 (OCCH$_3$) | 0.45 (COOC$_2$H$_5$) |
| Example 15 (I-3) | 0.50 (OCCH$_3$) | 0.45 (COOC$_{10}$H$_{21}$) |
| Example 16 (I-5) | 0.45 | 0.45 |
| Example 17 (I-6) | 0.43 | 0.43 |
| Example 18 (I-10) | 0.45 (COOC$_3$H$_7$-i) | 0.45 (COOC$_3$H$_7$-i) |
| Example 19 (I-12) | 0.68 | 0.43 |
| Example 20 (I-17) | 0.66 (CN) | 0.66 (CN) |
| Example 21 (I-18) | 0.68 (SO$_2$-phenyl) | 0.50 |
| Example 22 (I-21) | 0.45 | 0.50 |

Evaluation of Optical Recording Disc

The optical recording disc of each of Examples and Comparison Examples was rotated at a constant linear rate of 3.5 m/sec., and a blue-violet semiconductor laser light (oscillation wavelength: 408 nm) was applied to the recording disc to record 14T-EFM signals. Thereafter, the recorded signals were reproduced.

The recording and reproducing characteristics such as a modulation, a groove light-reflection, and a sensitivity at an optimum power were determined by means of DDU 1000 (available from Palstick Corporation). The results are set forth in Table 5.

TABLE 5

| Dye compound of Recording layer | Reflection (%) (Non-recorded area) | Modulation (%) | Sensitivity (mW) |
|---|---|---|---|
| Example 13 (I-1) | 84 | 62 | 10 |
| Example 14 (I-2) | 80 | 58 | 12 |
| Example 15 (I-3) | 82 | 55 | 14 |
| Example 16 (I-5) | 78 | 60 | 13 |
| Example 17 (I-6) | 76 | 59 | 11 |
| Example 18 (I-10) | 79 | 61 | 15 |
| Example 19 (I-12) | 77 | 63 | 13 |
| Example 20 (I-17) | 80 | 58 | 14 |
| Example 21 (I-18) | 75 | 59 | 14 |

TABLE 5-continued

| Dye compound of Recording layer | Reflection (%) (Non-recorded area) | Modulation (%) | Sensitivity (mW) |
|---|---|---|---|
| Example 22 (I-21) | 76 | 66 | 9 |
| Com. Ex. 12 A | 44 | 38 | 19 |
| Com. Ex. 13 B | 50 | 43 | 20 |
| Com. Ex. 14 C | 36 | 35 | 18 |
| Com. Ex. 15 D | 48 | 47 | 16 |

From the results set forth in Table 5, the optical recording discs of the invention (Examples 13 to 22) having a recording layer of the dye compound of the formula (I) are superior to the optical recording discs for comparison (Comparison Examples 12 to 15) having a recording layer of any one of the comparative dye compounds A to D, in their higher light-reflection, higher modulation, and higher sensitivity.

The above-mentioned results indicate that an optical information recording medium having a recording layer which comprises the dye compound of the formula (I) is favorably utilized for recording information in a higher density using a short wavelength laser light.

What is claimed is:

1. An optical information recording medium comprising a substrate and a recording layer provided thereon on which information is recorded by irradiation with a laser beam, wherein the recording layer comprises a dye compound having the following formula (I):

$$R^1R^2C=L^1-L^2=L^3-NR^3R^4 \quad (I)$$

in which each of $R^1$ and $R^2$ independently represents an electron-attracting group having a Hamett's substituent constant $\sigma_p$ in the range of 0.2 to 0.9; each of $L^1$, $L^2$, and $L^3$ independently represents a methine group which can have a substituent under such condition that two or three of $L^1$, $L^2$, and $L^3$ can form a ring structure together with the substituent; and each of $R^3$ and $R^4$ independently represents a hydrogen atom, an alkyl group, an aryl group, an aralkyl group, or a heterocyclic group, provided that each set of $R^1$ and $R^2$, $R^2$ and a substituent of $L^1$, $R^2$ and a substituent of $L^2$, $R^2$ and a substituent of $L^3$, a substituent of $L^1$ and $R^3$, a substituent of $L^2$ and $R^3$, a substituent of $L^3$ and $R^3$, and $R^3$ and $R^4$ can be connected to each other to form a ring structure.

2. The recording medium of claim 1, wherein each of $R^1$ and $R^2$ independently is a cyano group, a nitro group, an acyl group, an alkoxycarbonyl group, an aryloxycarbonyl group, a carbamoyl group, an alkylsulfonyl group, an arylsulfonyl group, an alkoxysulfonyl group, a sulfamoyl group, an alkylsulfinyl group, an arylsulfinyl group, a sulfino group, a halogen atom, an alkynyl group, a diacylamino group, a phosphono group, a carboxyl group, or a hetero-cyclic group.

3. The recording medium of claim 1, wherein each of $R^3$ and $R^4$ independently is a hydrogen atom, an alkyl group which has 1 to 20 carbon atoms and which can have one or more substituents, an aryl group which has 6 to 18 carbon atoms and which can have one or more substituents, an aralkyl group which has 7 to 18 carbon atoms and which can have one or more substituents, or a 5- or 6-membered hetero-cyclic group which can have one or more substituents.

4. The recording medium of claim 1, wherein the dye compound is represented by the following formula (I-A):

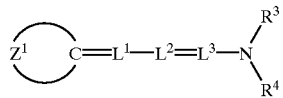

(I-A)

in which $Z^1$ stands for a group of atoms required for forming a 5- or 6-membered carbon ring or hetero-cyclic ring structure which can have one or more substituents; each of $L^1$, $L^2$, and $L^3$ independently represents a methine group which can have a substituent under such condition that two or three of $L^1$, $L^2$, and $L^3$ can form a ring structure together with the substituent; and each of $R^3$ and $R^4$ independently represents a hydrogen atom, an alkyl group, an aryl group, or an aralkyl group.

5. The recording medium of claim 1, wherein the dye compound is represented by the following formula (I-B):

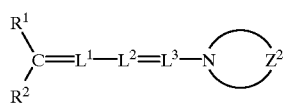

(I-B)

in which each of $R^1$ and $R^2$ independently represents an electron-attracting group having a Hamett's substituent constant $\sigma_p$ in the range of 0.2 to 0.9; each of $L^1$, $L^2$, and $L^3$ independently represents a methine group which can have a substituent under such condition that two or three of $L^1$, $L^2$, and $L^3$ can form a ring structure together with the substituent; and $Z^2$ stands for a group of atoms required for forming a 5- or 6-membered nitrogen atom-containing hetero-cyclic ring structure which can have one or more substituents.

6. The recording medium of claim 1, wherein the dye compound is represented by the following formula (I-C):

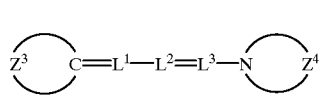

(I-C)

in which $Z^3$ stands for a group of atoms required for forming a 5- or 6-membered carbon ring or hetero-cyclic ring structure which can have one or more substituents; each of $L^1$, $L^2$, and $L^3$ independently represents a methine group which can have a substituent under such condition that two or three of $L^1$, $L^2$, and $L^3$ can form a ring structure together with the substituent; and $Z^4$ stands for a group of atoms required for forming a 5- or 6-membered nitrogen atom-containing hetero-cyclic ring structure which can have one or more substituents.

7. The recording medium of claim 1, wherein the dye compound is represented by the following formula (I-D):

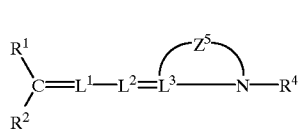

(I-D)

in which each of $R^1$ and $R^2$ independently represents an electron-attracting group having a Hamett's substituent constant $\sigma_p$ in the range of 0.2 to 0.9; each of $L^1$, $L^2$, and $L^3$ independently represents a methine group which can have a substituent under such condition that two or three of $L^1$, $L^2$, and $L^3$ can form a ring structure together with the substituent; $Z^5$ stands for a group of atoms required for forming a 5- or 6-membered nitrogen atom-containing hetero-cyclic ring structure which can have one or more substituents; and $R_4$ represents an alkyl group.

8. The recording medium of claim 1, wherein the dye compound is represented by the following formula (I-E):

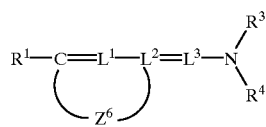

(I-E)

in which $R^1$ represents an electron-attracting group having a Hammett's substituent constant $\sigma_p$ in the range of 0.2 to 0.9; each of $L^1$ and $L^3$ independently represents a methine group which can have a substituent; $L^2$ represents a methine group; $Z^6$ stands for a group of atoms required for forming, in combination of $C=L^1—L^2$ group, a 5- or 6-membered carbon ring or hetero-cyclic ring structure which can have one or more substituents; and each of $R^3$ and $R^4$ represents an alkyl group.

9. The information recording medium of claim 1, wherein the substrate is a transparent disc which has on one surface a pre-groove having a track pitch of 0.2 to 0.8 μm and the recording layer is arranged on the surface having the pre-groove.

10. The information recording medium of claim 1, wherein a metallic light-reflecting layer is place on the recording layer.

11. The information recording medium of claim 1, wherein a protective layer is provided on or above the recording layer.

12. A method of recording information on the information recording disc of claim 1 by means of a laser beam having a wavelength of 550 nm or shorter.

13. A method of claim 12, the recording is performed by means of a laser beam having a wavelength of 450 nm or shorter.

* * * * *